(12) United States Patent
Adler et al.

(10) Patent No.: US 7,110,900 B2
(45) Date of Patent: Sep. 19, 2006

(54) DETERMINATION OF WAVEGUIDE PARAMETERS

(75) Inventors: Frank Adler, Idron (FR); Everhard Muyzert, Girton (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 10/820,088

(22) Filed: Apr. 7, 2004

(65) Prior Publication Data

US 2004/0230389 A1 Nov. 18, 2004

(30) Foreign Application Priority Data

Apr. 11, 2003 (GB) .................................. 0308355.7

(51) Int. Cl.
*G01R 23/16* (2006.01)
(52) U.S. Cl. ........................................................ 702/76
(58) Field of Classification Search .................. 702/75, 702/76, 170–172; 385/122, 123; 367/48, 367/49, 75; 73/597–602

See application file for complete search history.

(56) References Cited

U.S. PATENT DOCUMENTS

| 3,864,667 A | 2/1975 | Bahjat |
| 6,360,609 B1 | 3/2002 | Wooh |

FOREIGN PATENT DOCUMENTS

JP 2002-055090 A 2/2002

OTHER PUBLICATIONS

Claerbout Transforms Fundamentals of geophysical data processing, Blackwell Scientific Publications, 1985, p. 19, equation 1-5-9.

Ewing et al A layered half space Elastic waves in layered media, McGraw-Hill, 1957, equation 4-78 on p. 138-139.

Iranpour et al Local velocity analysis by parametric wavenumber estimation in seismic (fk-MUSIC) EAGE 64th conference and exhibition, Florence, Italy, May 27-30, 2002, P171.

McMechan et al Analysis of dispersive waves by wave field transformation Geophysics, vol. 46, No. 6, 1981, pp. 869-874.

Park et al Imaging dispersion curves of surface waves on multi-channel record Society of Exploration Geophys., Expanded Abstracts SP 10.8, 1998, pp. 1377-1380.

Roth et al Joint inversion of Rayleigh and guided waves in high-resolution seismic data using a genetic algorithm Society of Exploration Geophys., Expanded Abstracts ST 5.3, 1998, pp. 1570-1573.

Xia et al Estimation of near-surface shear-wave velocity by inversion of Rayleigh waves Geophysics, vol. 64, No. 3, 1999, pp. 691-700.

*Primary Examiner*—Michael Nghiem
(74) *Attorney, Agent, or Firm*—Steven Gahlings; Jody Lynn DeStefanis; Dale Gaudier

(57) ABSTRACT

A method of determining at least one parameter of a waveguide (3) from wavefield data acquired from wave propagation in the waveguide including obtaining first and second dispersion curves (9a, 9b, 9c) in the frequency domain from the wavefield data. A frequency interval between the first dispersion curve and the second dispersion curve is found, and this is used in the determination of at least one parameter of the waveguide. The frequency separation $\Delta f(V)$ between the first and second dispersion curves may be found at a particular value of the phase velocity V, and the thickness h of the waveguide can be found using:

$$\Delta f(V) = \frac{c_1}{2h\sqrt{1 - \frac{c_1^2}{V^2}}}$$

Here, $c_1$ is the velocity of wave propagation in the waveguide. This may be found from the asymptotic velocity values of the dispersion curves.

25 Claims, 10 Drawing Sheets

$\Delta f_1 = f_2 - f_1$ $\Delta f_2 = f_3 - f_2$ $\Delta f = \frac{1}{2}(\Delta f_1 + \Delta f_2)$

DETERMINATION OF WAVEGUIDE PARAMETERS

FIELD OF THE INVENTION

The present invention relates to the determination of parameters of a waveguide from wavefield data acquired from waves propagating in the waveguide. The invention may be used to obtain information about, for example, the thickness of the waveguide and/or the velocity of propagation of waves within the waveguide.

BACKGROUND OF THE INVENTION

Guided waves result from multiple reflections in layered media. A guided wave occurs when a wave propagating in a layer is incident on a boundary of the layer at an angle to the surface normal greater than the "critical angle". As is well known, when the incident angle to the surface normal is greater than the critical angle, the sine of the angle of transmission to the surface normal, as determined by Snell's Law, is greater than 1. A wave transmitted out of the layer may exist only as an evanescent wave, and the phenomenon of "total internal reflection" occurs. The waves are therefore trapped in the layer and propagate as guided waves within the layer that do not decay significantly with travel distance. A layer that transmit guided waves in this way is called a "waveguide". The waveguide effect is shown schematically in FIG. 1. A wave 1 propagating in a layer 2 is incident on a boundary 3 of the layer. When the incident angle to the surface normal is greater than the critical angle $\theta_c$, total internal reflection occurs leading to a guided wave. This is shown by the full line in FIG. 1. (If the angle of incidence, to the normal to the surface 3, is less than the critical angle then the wave is partially transmitted and partially reflected, as shown by the dotted lines.)

When the guided waves are recorded along the waveguide surface the apparent slowness or phase velocity of the guided waves exhibit dispersion—that is, they are each a function of the frequency of the waves. This dispersive character of guided waves can be used to obtain information about a waveguide or, more generally, about material properties of, and wave propagation velocities in, layered media. This is commonly achieved by solving an inverse problem, and matching a dispersion curve obtained for a numerical model of a waveguide to an observed dispersion curve. One such method is described by M. Roth and K. Holliger, in "Joint inversion of Rayleigh and guided waves in high-resolution seismic data using a genetic algorithm", Society of Exploration Geophysicists, Expanded Abstracts, pp 1570–1573 (1998). They suggested picking the dispersion curves of Rayleigh waves and guided waves in dispersion images and inverting them to obtain the velocity of P-waves, the velocity of S-waves, and the density of the waveguide using a genetic algorithm. This method requires an iterative inversion for P-velocity, S-velocity and waveguide density in the top layer and halfspace—6 parameters in total—and so requires considerable computing power. Furthermore, this method requires the waveguide density, either as prior knowledge or as a parameter in the inversion.

Dispersion images have also been used, by J. Xia et al. in "Estimation of near-surface shear-wave velocity by inversion of Rayleigh waves", Geophysics, Vol. 64, pp 691–700 (1999), to analyse dispersion curves of Rayleigh waves. The inversion of Rayleigh waves provides only S-velocities. The P-velocities are assumed to be known. This method also requires knowledge of the density of the waveguide layer.

SUMMARY OF THE INVENTION

In many technological applications of wave propagation, such as seismic surveying, one particular interest is the determination of wave propagation velocities. In many cases the earth's interior has a layer at or near the surface in which the velocity of propagation of seismic energy is different from the velocity of propagation of seismic energy in underlying layers. The presence of this layer causes a shift, known as the "static shift", in the arrival time of seismic energy recorded at seismic receivers disposed on or at the earth's surface, compared to the arrival time that would be recorded if the seismic velocity in the surface or near-surface layer were the same as the seismic velocity in the underlying layer. The static shift must be taken into account when analysing seismic data, and this requires knowledge of the velocity of propagation of seismic energy in the surface or near-surface layer and the thickness of the surface or near-surface layer. One approach to measuring these quantities is to treat the surface or near-surface layer as a waveguide and estimate the seismic velocity in the surface or near-surface layer and the thickness of the surface or near-surface layer from measurements of the wavefield recorded at the earth's surface.

The present invention provides a method of determining at least one parameter of a waveguide from wavefield data acquired from wave propagation in the waveguide, the method comprising the steps of: obtaining first and second dispersion curves in the frequency domain from the wavefield data; and determining at least one parameter of the waveguide from a frequency interval between the first dispersion curve and the second dispersion curve.

The invention uses the multiple character of guided waves to obtain waveguide parameters, such as a wave propagation velocity within the waveguide (hereinafter referred to as a "waveguide velocity" for convenience") and/or the thickness of a waveguide, from measurements of the wavefield recorded at the surface of the waveguide. If the waveguide thickness is of the order of the wavelength or thinner, the multiple reflections of the guided waves interfere with one another and so are not separable in the time domain. The invention overcomes this by making use of the fact that, in the frequency domain, the dispersion curves corresponding to different guided wave modes are separate. Parameters of the waveguide, such as waveguide velocity and the thickness of the waveguide may be determined from the dispersion curves in the frequency domain.

The invention can be applied to any wavefield that propagates in a waveguide and is recorded at the surface of the waveguide. In the field of seismic surveying, for example, it may be used to estimate parameters of an overlying layer of the earth's interior for use in correction of the static shift, or in wavefield separation. In a land-based seismic survey, an elastic wavefield is generated by explosive devices or vibrators and the wavefield propagating through a near surface layer that acts as a waveguide is recorded by geophones. In marine seismic surveying, an acoustic wavefield is commonly generated in the water by airguns and recorded in the water by hydrophones. If the wavefield is recorded on the seabed, hydrophones and geophones are used to record the acoustic and elastic wavefields respectively.

When applied to seismic surveying, the invention is able to estimate the velocity of P-waves and/or the velocity of S-waves. The method of the invention is independent of the density of the medium, and so does not require this information to be known.

A second aspect of the invention provides a method of processing wavefield data, the method comprising: acquiring wavefield data; determining at least one parameter of a waveguide according to a method of the first aspect of the invention; and taking the at least one parameter into account during subsequent processing of the wavefield data.

The wavefield data may be seismic wavefield data.

A third aspect of the invention provides an apparatus for determining at least one parameter of a waveguide from wavefield data acquired from wave propagation in the waveguide, the apparatus comprising: means for obtaining first and second dispersion curves in the frequency domain from the wavefield data; and means for determining at least one parameter of the waveguide from a frequency interval between the first dispersion curve and the second dispersion curve.

The apparatus may comprise a programmable data processor.

A fourth aspect of the invention provides a storage medium containing a program for the data processor of an apparatus as defined above.

A fifth aspect of the invention provides a storage medium containing a program for controlling a programmable data processor to carry out a method of the first aspect of the invention.

BRIEF DESCRIPTION OF THE DRAWINGS

Preferred embodiments of the present invention will now be described by way of illustrative example with reference to the accompanying figures, in which.

DETAILED DESCRIPTION OF THE INVENTION

Figure 1:
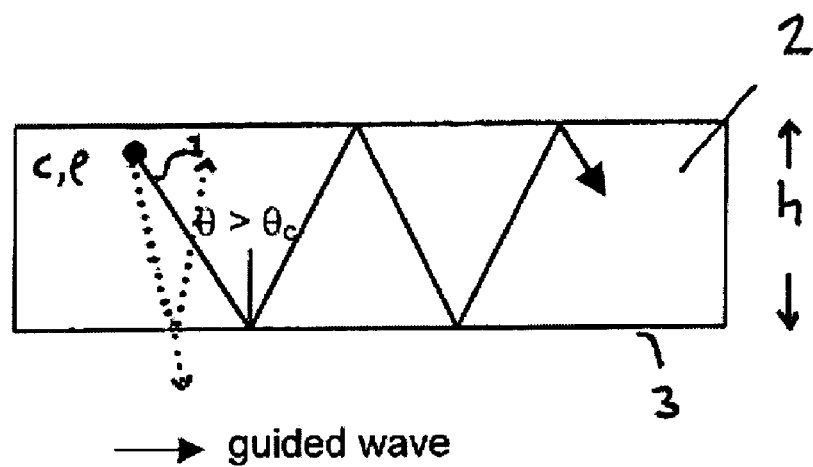
FIG. 1 is a schematic illustration of propagation of a guided wave.
Figure 2:
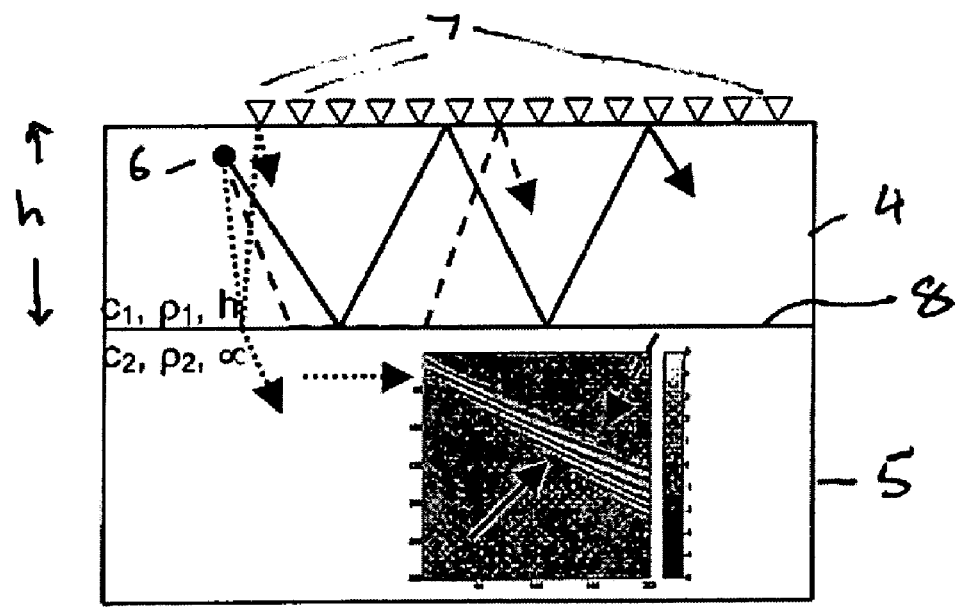
FIG. 2 is a schematic illustration of propagation of seismic energy in a layer of the earth's interior.

FIG. 2 illustrates typical paths of seismic energy at a survey location where the earth's interior is represented by a layer 5 that is overlaid by a thin layer 4. A seismic source 6 is located in the overlying layer 4 and, when actuated, emits seismic energy. The emitted seismic energy is detected by an array of suitable detectors 7 disposed at the earth's surface.

The overlying layer 4 has thickness h, acoustic velocity $c_1$ and density $\rho_1$. The underlying layer 5 has an acoustic velocity $C_2$ and density $\rho_2$, which are assumed to be different from the acoustic velocity and density of the overlying layer 4 ($C_2$ will be greater than $c_1$). In theory, the layer 5 is assumed to have infinite depth. However, in practice, described methods also work when layer 5 has finite depth.

FIG. 2 shows three possible paths of seismic energy emitted by the source 6. Seismic energy that travels along the path shown as a dotted line is incident on the interface 8 between the overlying layer 4 and the underlying layer 5 at an angle, to the normal to the interface, that is less than the critical angle. As a consequence, some of the seismic energy is reflected and some is transmitted.

Seismic energy that travels along the path shown as a broken line is incident on the interface 8 at exactly the critical angle to the normal to the interface 8. This energy undergoes critical refraction, propagates along the interface 8, and is subsequently refracted upwards.

Seismic energy that travels along the path shown as a full line is incident on the interface 8 at an angle to the normal to the interface that is greater than the critical angle, and undergoes total internal reflection. This energy is trapped in the layer 4, and forms a guided wave that propagates through the layer 4. The layer 4 thus acts as a waveguide.

Figure 3:
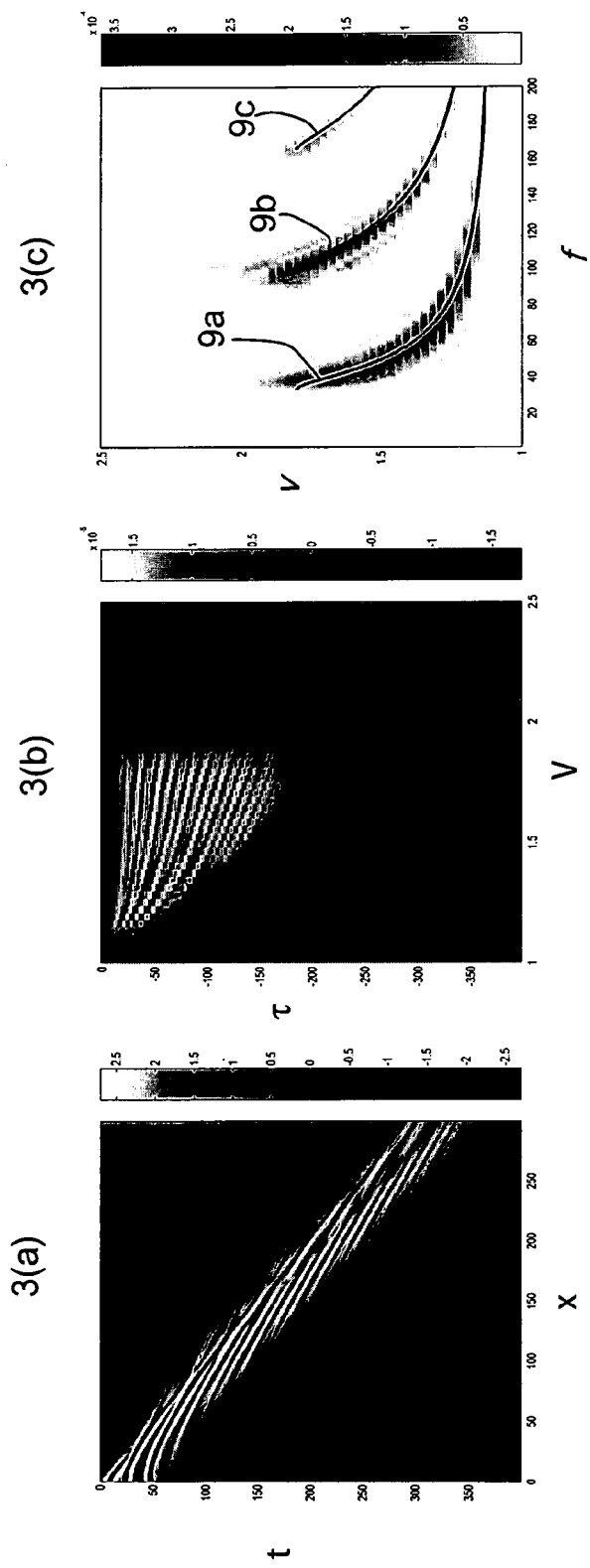
FIG. 3(a) shows seismic data acquired in the seismic surveying arrangement of FIG. 2.
FIGS. 3(b) and 3(c) illustrate steps in obtaining a dispersion curve in the frequency domain from the seismic data of FIG. 3(a)

FIG. 3(a) shows the seismic energy recorded at the receivers 7 in FIG. 2. FIG. 3(a) shows the amplitude of the vertical velocity component of the acquired seismic energy as a function of the horizontal distance X from the source and as a function of the time t since the actuation of the source 6. The greatest positive amplitude in FIG. 3(a) is shown as white, and the greatest negative amplitude is shown as black, as indicated in the key at the right of FIG. 3(a). It will be seen that events corresponding to reflected waves (such as the path shown in dotted lines in FIG. 2), to critically refracted waves (such as the path shown in broken lines in FIG. 2) and to guided waves (such as the path shown in full lines in FIG. 2) can be identified in the seismic data. FIG. 3(a) is reproduced as an inset in FIG. 2, and the dotted arrow, the broken arrow and the full arrow in the inset in FIG. 2 indicate events corresponding to, respectively, reflected waves, critically refracted waves and guided waves.

The seismic data of FIG. 3(a) may be recorded in any conventional manner. Typically, the data are obtained using digital receivers that sample the wavefield at the receiver position at regular intervals. The sampled data may be stored in each receiver for subsequent retrieval, or they may be transmitted immediately to a central computer for storage there.

The recorded data of FIG. 3(a) are the vertical component of the velocity field as a function of the x-coordinate and time, and may be denoted as s(x,t). In order to perform the method of the invention, the recorded data s(x,t) are transformed into a dispersion image in the frequency domain. FIG. 3(c) shows the result of transforming the data of FIG. 3(a) into a dispersion image in the frequency-phase velocity domain via the t-V domain as shown by McMechan and Yedlin in "Analysis of Dispersive Waves by Wavefield Transformation" Geophysics Vol. 48 pp 869–874 (1981). In FIG. 3(c), the regions of highest amplitude in the dispersion image are shown in black, while regions of lowest amplitude are shown as white, as indicated by the key at the right of FIG. 3(c). It will be seen that the regions of highest amplitude in the dispersion image of FIG. 3(c) align along dispersion curves, and these are indicated in FIG. 3(c) as full lines. Each dispersion curve 9a, 9b, 9c shown in FIG. 3(c) corresponds to a different mode of wave propagation.

The curves shown as full lines in FIG. 3(c) are calculated according to equation (1) below.

FIG. 3(b) illustrates, as a comparison, the data in the time domain, in this case in the τ-V (intercept time-velocity) domain. It will be seen that the different reflection events interfere, and are not separable from one another.

FIG. 3(b) represents an intermediate step in the transformation to the frequency domain. The image in the frequency-velocity domain is, in this example, obtained by the method of McMechan and Yedlin (above), who first transform data to the t-p (intercept time-slowness) domain, and then apply a Fourier transform to get to the f-v or f-p domain. An alternative approach is to transform the data from the x-t domain to the f-x domain, and then to the f-p or f-v domain.

A dispersion relation for acoustic guided waves has been derived by W M Ewing et al in "Elastic Waves in Layered Media", McGraw-Hill (1957). They derived the following expression for the dispersion curves of acoustic-guided waves:

$$\tan\left(\frac{\omega}{V}h\sqrt{\frac{V^2}{c_1^2}-1}\right) = \tan\left(\frac{\omega}{c_1}h\sqrt{1-\frac{c_1^2}{V^2}}\right) = -\frac{\rho_2}{\rho_1}\frac{\sqrt{\frac{V^2}{c_1^2}-1}}{\sqrt{1-\frac{V^2}{c_2^2}}} \quad (1)$$

In Equation (1), V is the phase velocity, and ω(=2πf) is the angular frequency. The parameters h, $c_1$, $\rho_1$, $c_2$ and $\rho_2$ have the meanings defined with reference to FIG. 2.

Equation (1) correctly predicts that, at a given phase velocity, the frequency interval between each pair of adjacent or successive dispersion curves is constant since the argument of the tangent function must fulfil:

$$\frac{2\pi hf}{c_1}\sqrt{1-\frac{c_1^2}{V^2}} = n\pi \quad (2)$$

Equation (2) indicates that the frequency difference between successive dispersion curves is a function of the phase velocity V, and is given by:

$$\Delta f(V) = f_{n+1} - f_n = \frac{c_1}{2h\sqrt{1-\frac{c_1^2}{V^2}}}. \quad (3)$$

The number n refers to the mode number in dispersion curve theory.

It will be noted that the densities $\rho_1$, $\rho_2$ do not appear in equation (3). The present invention takes advantage of this, and uses equation (3), rather than equation (1), for waveguide parameter estimation.

Figure 4:
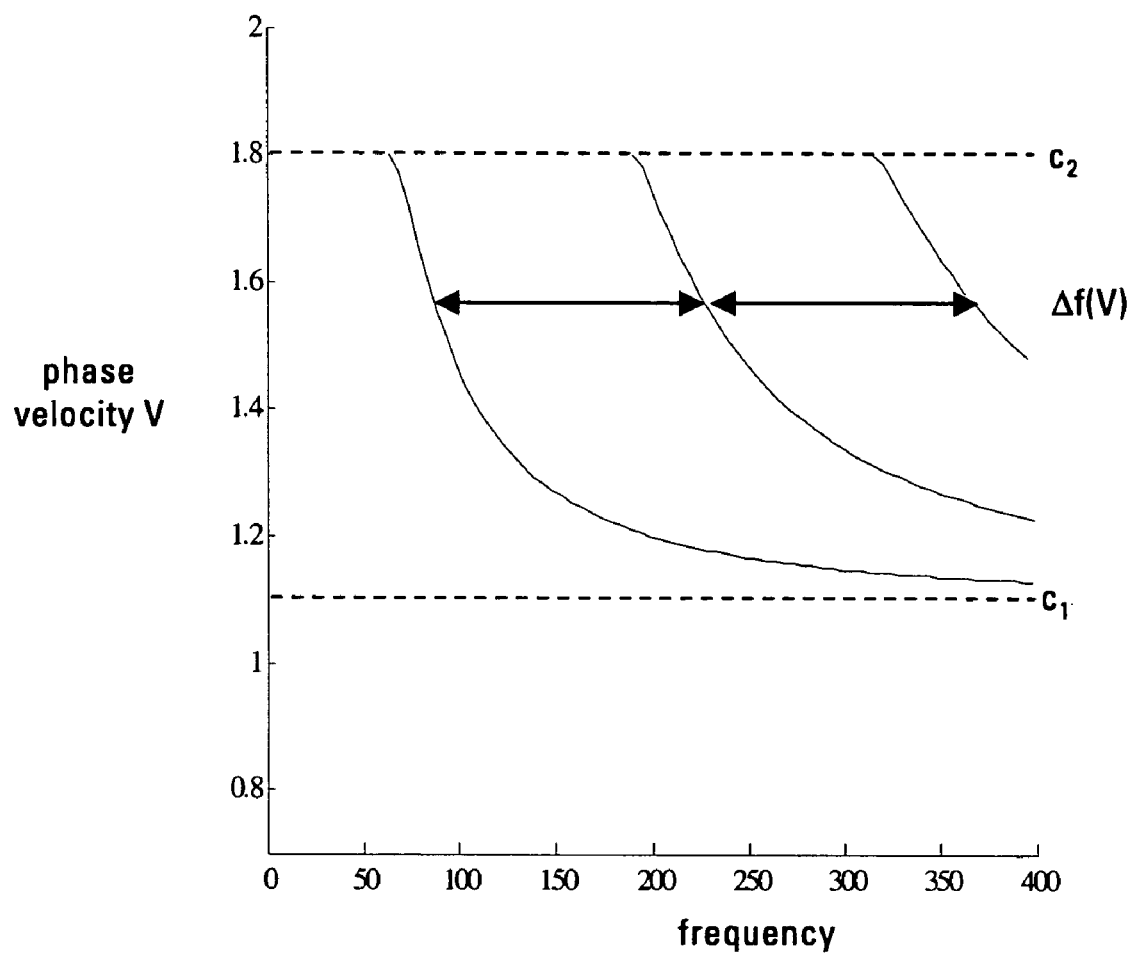
FIG. 4 illustrates a typical set of dispersion curves obtained from the seismic data of FIG. 3(a)

FIG. 4 shows a set of dispersion curves having the general formula of equation (1). It was shown in equation (3) that, at a given phase velocity V, there is a constant frequency difference between each pair of immediately successive dispersion curves. It will be seen that the dispersion curves of FIG. 3(c), obtained from the seismic data of FIG. 3(a), have the same form as the theoretical dispersion curves shown in FIG. 4.

The present invention provides a method for obtaining properties of a waveguide from dispersion curves that have the general form shown in FIG. 3(c) or FIG. 4. The essential concept of the invention is to determine the frequency difference Δf between adjacent dispersion curves (i.e., between dispersion curves of adjacent modes) for a particular phase velocity. It is then possible to determine parameters of the waveguide in which the wavefield data used to obtain the dispersion curves were obtained.

In a simple realisation of the invention, the frequency difference Δf between adjacent dispersion curves may be simply picked from a dispersion image that is displayed, for example, as a hard copy or on a computer screen.

In order to solve equation (3) to determine the thickness h of the waveguide explicitly, it is necessary to know the frequency difference Δf for a particular phase velocity, and to have an estimate of the waveguide velocity $c_1$. Both these quantities may be determined from a dispersion curve of the type shown in FIG. 4. As is clear from FIG. 4, the waveguide velocity $c_1$, is given by the asymptotic velocity of the dispersion curve(s) at high frequency values. The asymptotic velocity of the dispersion curve is shown as a broken line in FIG. 4.

Figure 5:
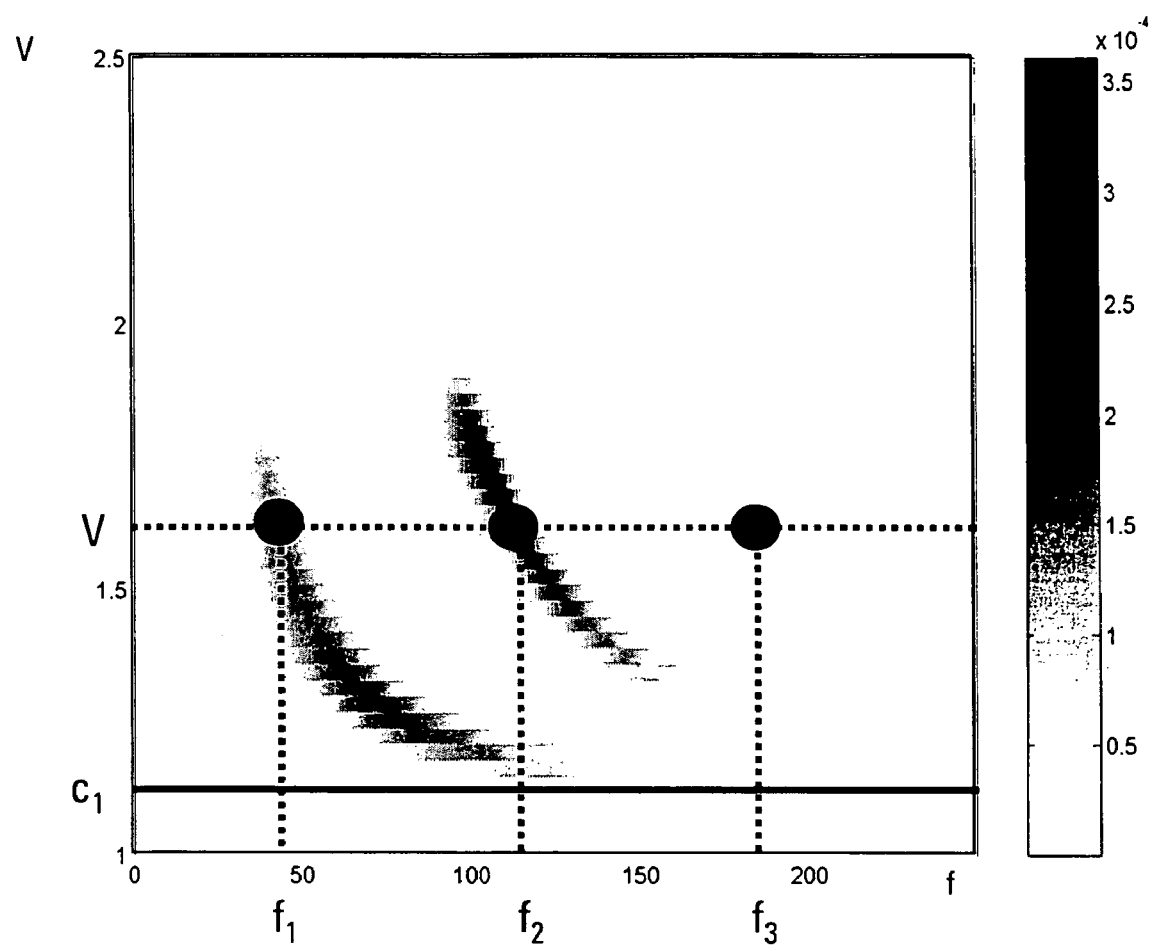
FIG. 5 illustrates one method of determination of waveguide parameters from the dispersion curves of FIG. 4.
Figure 8:
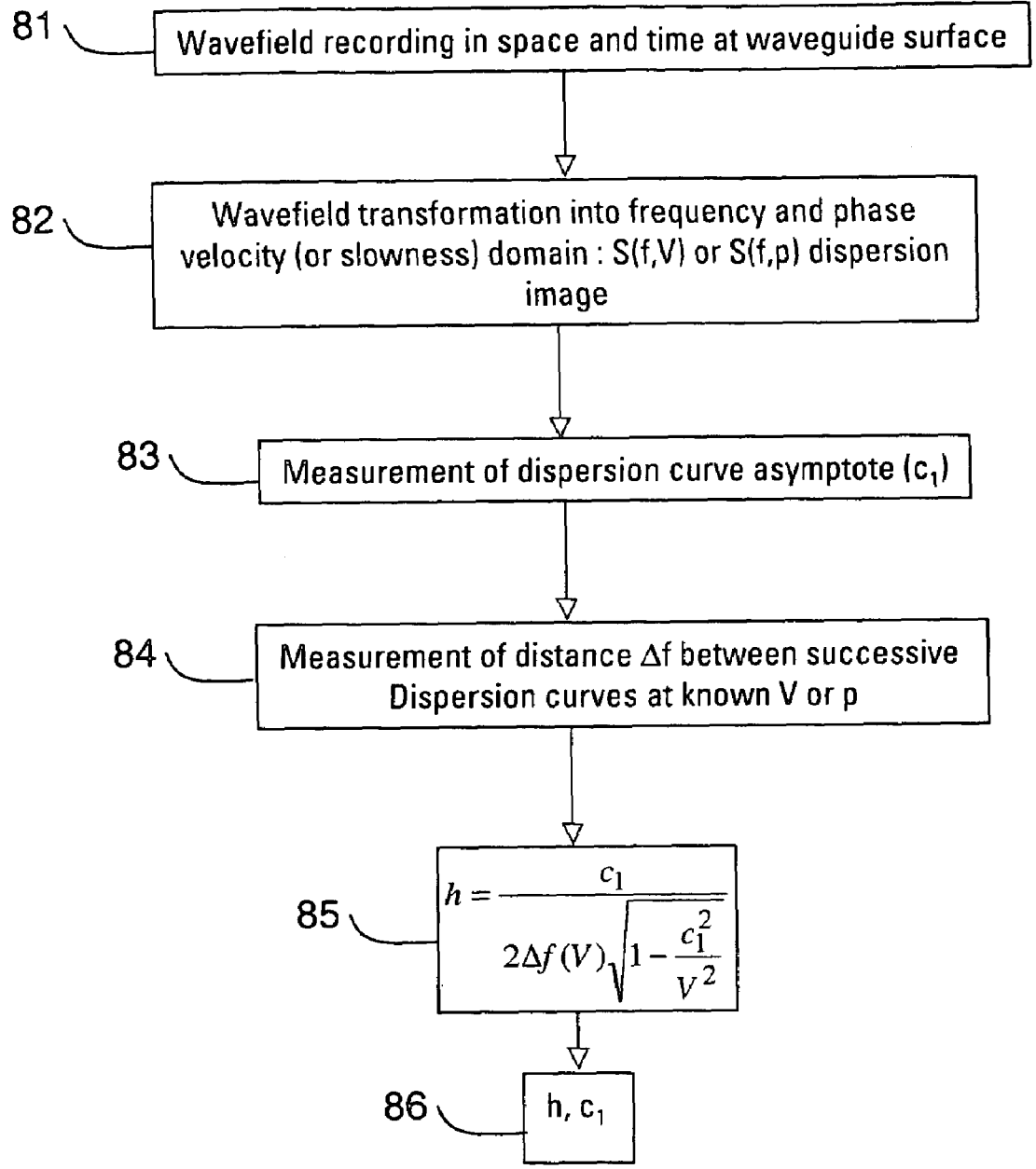
FIG. 8 is a schematic flow diagram of one embodiment of the present invention.

This embodiment of the invention is illustrated in FIGS. 5 and 8. FIG. 5 illustrates how the quantities Δf (for a given phase velocity) and $c_1$ may be determined from displayed dispersion curves. In principle, the frequency difference Δf between two successive dispersion curves is simply measured from displayed dispersion curves for a known value of the phase velocity. If only two dispersion curves are available, then a single value for the frequency difference at a particular phase velocity can be obtained. However, if three or more dispersion curves are available, it is possible to obtain two or more values of the frequency difference for a known value of the phase velocity. In FIG. 5, for example, three dispersion curves are visible, which have frequencies at a particular phase velocity V of $f_1$, $f_2$ and $f_3$ respectively. It is therefore possible to obtain two values for the frequency difference at a given phase velocity V, as follows:

$\Delta f_1 = f_2 - f_1$;

$\Delta f_2 = f_3 - f_2$

These two values of the frequency difference at a particular phase velocity may be averaged using $\Delta f_{av} = (\Delta f_1 + \Delta f_2)/2$.

As noted above, the asymptotic velocity to the dispersion curves is equal to the waveguide velocity $c_1$ and this may, in principle, again be directly determined from a displayed dispersion curve as shown in FIG. 5. Thus, the value of the waveguide velocity may be directly obtained from a dispersion curve in the frequency domain (or may be determined as the average of the asymptotic velocities of two or more dispersion curves). Furthermore, once the waveguide velocity $c_1$ and the frequency difference Δf(V) between successive dispersion curves at a known phase velocity V has been determined, it is then possible to determine the waveguide thickness from equation (3). All quantities in equation (3), except for h, may be obtained from the dispersion image. In this connection, it will be noted that the density of the waveguide does not appear in equation (3).

FIG. 8 is a flow diagram showing the principal steps of the method illustrated in FIG. 5. Initially, at step 81, a wavefield is recorded in the time-space domain. This may be done, for example using an array of receivers as shown in FIG. 2 disposed at the surface of a waveguide. This step will typically record the amplitude of a component of the wavefield as a function of space and time. FIG. 3(a) illustrates one form in which these results may be obtained.

Next, at step 82, the wavefield data obtained in step 81 are transformed from the space-time domain into the frequency domain. Step 82 may consist of transforming the data into the frequency and phase velocity domain as in FIG. 3(c), or into the frequency and slowness domain. The transform may be carried out using any suitable technique. The result of step 82 is a dispersion image that will be generally similar to the dispersion image of FIG. 3(c). A set of dispersion curves may then be defined, for example as curves defined by the regions in which the amplitude of the dispersion image is a maximum.

Once a set of dispersion curves has been obtained, the asymptote to the dispersion curves is measured. If step 82 provides a dispersion image in the frequency and phase-velocity domain, step 83 will provide an asymptotic value of the phase velocity which, as explained above, is equal to the phase velocity of the waveguide. If step 82 provides a frequency-slowness dispersion image, the asymptote corresponds to the slowness of the waveguide. There is a corresponding version of equation (3) for this case, in which V is replaced by $p_x$, and $c_1$ is replaced by $1/p$, where p is the medium slowness.

Next, at step 84, the frequency distance $\Delta f$ between two successive dispersion curves is measured. This is measured for a known value of the phase velocity if step 82 provides a dispersion curve in the frequency and phase velocity domain, or is measured at a known value of the slowness if step 82 provides a dispersion curve in the frequency and slowness domain. If more than two dispersion curves are available, more than one value of $\Delta f$ may be determined at step 84 and in this case an average frequency difference, $\Delta f_{av}$, can be determined.

It should be noted that steps 83 and 84 do not need to be performed in the order shown in FIG. 8. These steps could be performed in the reverse order, and in principle could be performed simultaneously.

Next, at step 85 the thickness h of the waveguide layer is determined using equation (3) using the value for the waveguide velocity $c_1$ determined at step 83, using the frequency difference $\Delta f$ (or average frequency difference $\Delta f_{av}$) determined at step 84, and using the value of the phase velocity V for which the frequency difference (or average frequency difference) was determined at step 84.

Finally, at step 86 the value of the waveguide thickness h determined at step 85 and the value of the waveguide velocity $c_1$ determined at step 83 may be output.

It should be noted that the wave velocity $c_2$ of the layer below the waveguide layer (for example the layer 5 in FIG. 2) may also be determined from a dispersion curve of the general form of FIG. 3(c). As indicated in FIG. 4, this velocity is the maximum velocity at which the dispersion curve(s) exist.

Of course, if prior information about the waveguide velocity $c_1$ is available, for example from knowledge of the composition of the waveguide, then this information may be used as well as, or instead of, information about the waveguide velocity $c_1$ derived from the dispersion curve.

The frequency difference is preferably determined at phase velocity where the resolution of the dispersion image is good. In principle, however, the frequency difference may be determined at any phase velocity between $c_1$ and $c_2$.

The simple method described in FIGS. 5 and 8 can in principle provide good results if the dispersion image has a high resolution so that the frequency difference between adjacent dispersion curves and the asymptotic velocity can be determined accurately. However, this may not always be the case and, in particular, the asymptote to the dispersion curves may not be well defined so that the waveguide velocity $c_1$ cannot be easily obtained by inspection of the dispersion curves. In such circumstances, it may be preferable to employ an alternative method that is shown in FIG. 9.

Figure 9:
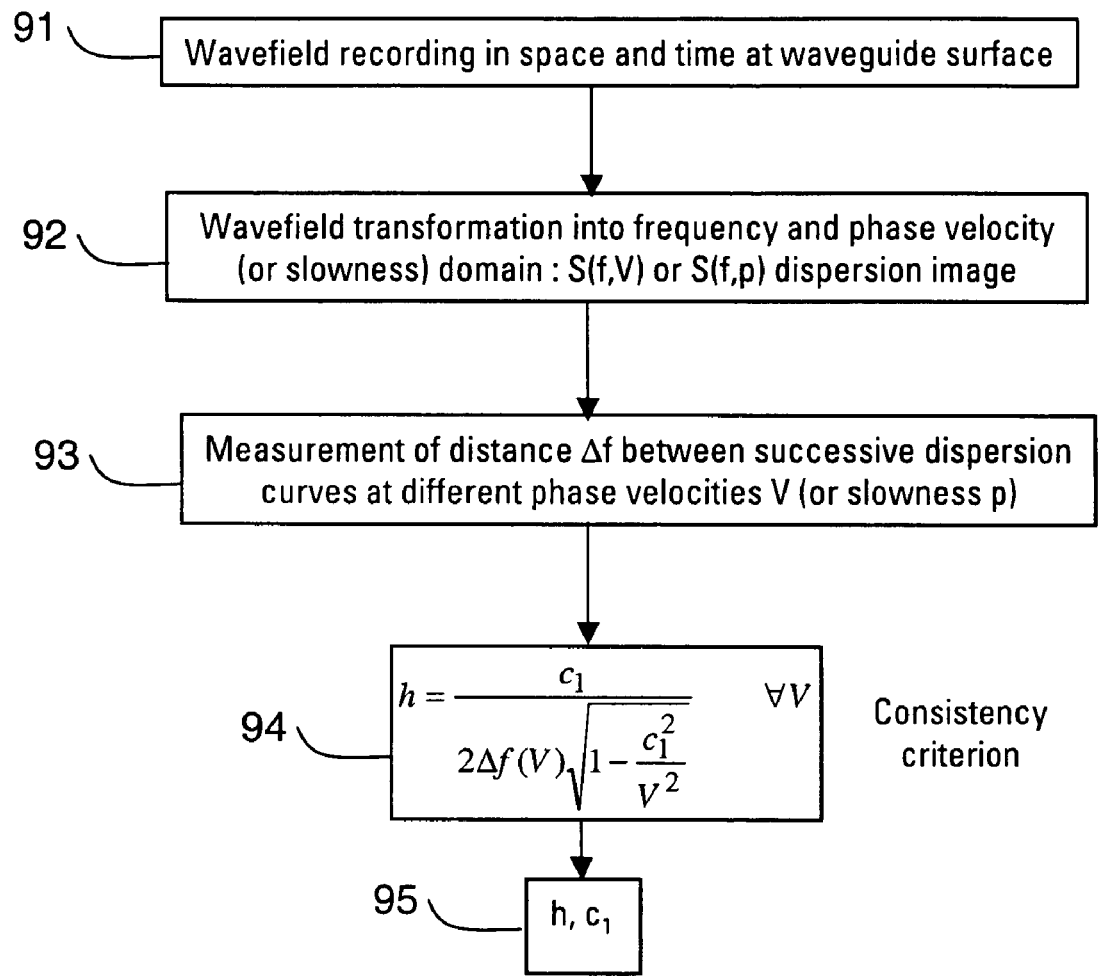
FIG. 9 is a schematic flow diagram of a second embodiment of the present invention.

In the method of FIG. 9, a wavefield is recorded in the space-time domain at the surface of a waveguide, and at step 92 this is transformed to give a dispersion image in the frequency domain. Steps 91 and 92 correspond to steps 81 and 82 of FIG. 8, and will not be described in further detail.

Figure 10:
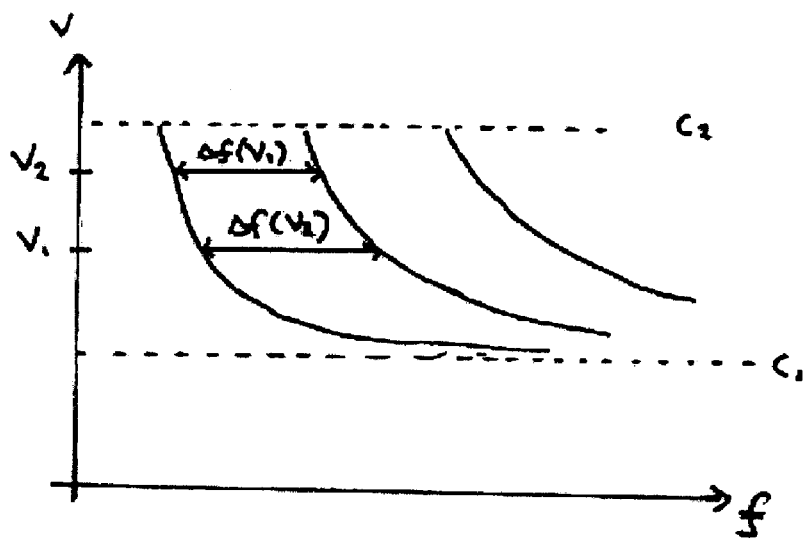
FIG. 10 illustrates the second embodiment of the present invention.

Next, the frequency difference between two successive dispersion curve is measured for two or more different values of the phase velocity or slowness (depending on the particular dispersion image produced at step 92). For example, as shown in FIG. 10, the frequency difference between two successive dispersion curves is measured at two different values $V_1$, $V_2$ of the phase velocity. If more than two dispersion curves are available, the frequency difference estimated for one or more of the phase velocities can be obtained using the averaging process described above.

The thickness of the waveguide is then determined from the sets of values $(\Delta f(V_1), V_1)$, $(\Delta f(V_2), V_2)$ etc., according to the following equation:

$$h = \frac{c_1}{2\Delta f(V)\sqrt{1 - \frac{c_1^2}{V^2}}} \quad \forall V \qquad (4)$$

Equation (4) essentially states that the same value of the thickness of the waveguide should be obtained from every set of $(\Delta f(V_i), V_i)$, since the thickness of the waveguide is independent of the phase velocity. Equation (4) expresses this as a consistency criteria. If h and $c_1$ are both unknown, it is possible to determine both h and $c_1$ provided that values for $\Delta f(V)$ are available for two or more different values of the phase velocity.

It is very easy to obtain self-consistent values for the waveguide thickness and the waveguide velocity using equation (4), provided that the frequency difference is known for two or more different values of the phase velocity. In this connection, it will again be noted that the density of the waveguide does not appear in equation (4). It is therefore straightforward to obtain accurate results for the waveguide thickness and the waveguide velocity $c_1$, even if the asymptote to the dispersion curves is not well-defined and the waveguide velocity cannot be determined by inspection of the dispersion curves.

In the method of FIG. 9, therefore, once values for the frequency separation between successive dispersion curves have been obtained for at least two different phase velocities, equation (4) is solved at step 94 to obtain self-consistent values for the waveguide thickness and the waveguide velocity. The self-consistent values of the waveguide thickness h and the waveguide velocity $c_1$ are those values that provide a value for the thickness h of the waveguide that is most nearly independent of the phase velocity.

Figure 11:
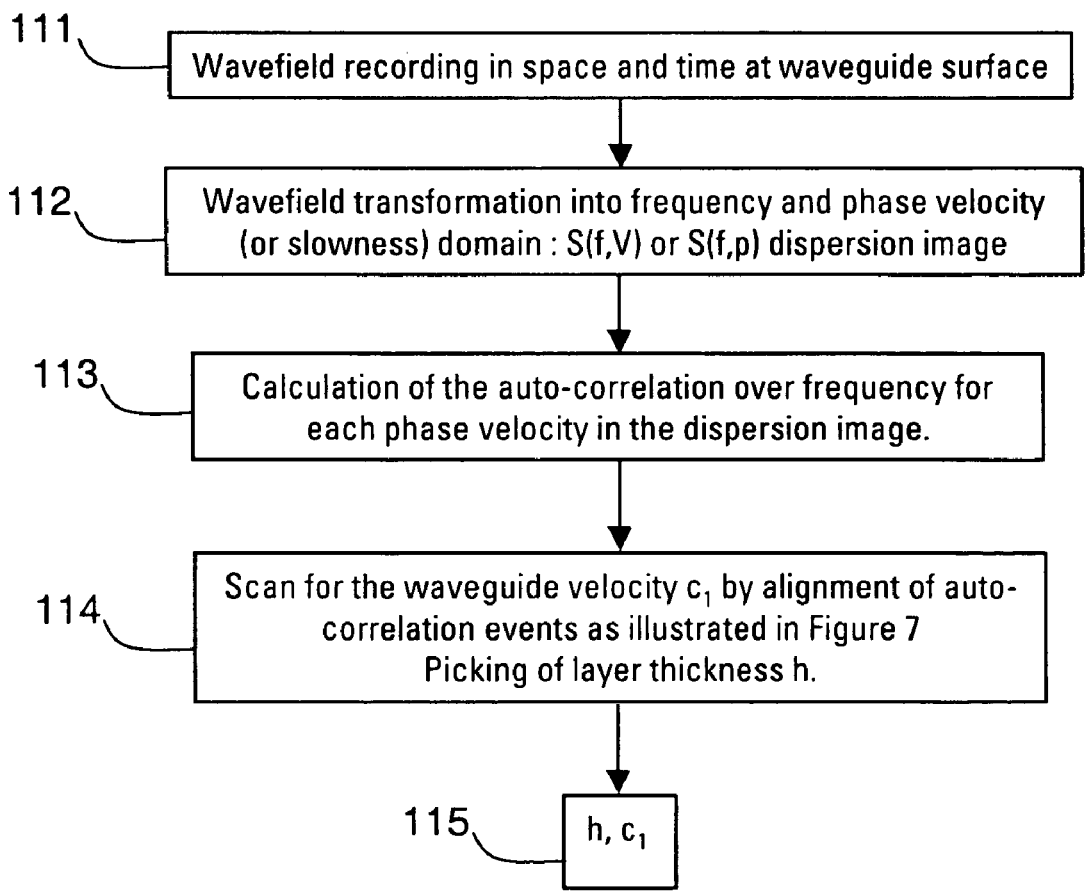
FIG. 11 is a schematic flow diagram of a third embodiment of the present invention.

FIG. 11 illustrates a further method of determining one or more waveguide parameters from wavefield data recorded in the space/time domain. Initially, wavefield data is recorded in the space/time domain at step 111 and is transformed to produce a dispersion image in the frequency domain at step 112. These steps correspond to steps 81 and 82 respectively and will not be further described here.

The method of FIG. 11 uses an auto-correlation technique to determine the waveguide thickness and the waveguide velocity. It is known to detect a periodic signal by calculating the autocorrelation of a series of samples and picking the maxima in the auto-correlation function, but the invention extends this technique by applying it to the dispersion image obtained in the frequency domain.

In this method the recorded data s(x,t) in the time domain are transformed into a dispersion image in the frequency domain. For the purpose of description it will be assumed that the data are transformed into a dispersion image S(f,V) in the frequency-phase velocity domain, but the invention is not limited to this particular transformation. This transformation may be carried out according to any known technique such as, for example, the technique described by G A McMechan and M J Yedlin (above) or by C B Park et al. in "Imaging Dispersion Curves of Surface Waves on Multichannel Record", Society of Exploration Geophysicists, Expanded abstracts, pp 1377–1380 (1998). This transformation produces complex-valued Fourier coefficients S(f,V) of the dispersion image. These complex-valued Fourier coefficients are then auto-correlated according to:

$$R_{k,V} = \sum_i \bar{S}_{i,V} S_{k,V} \qquad (5)$$

Figure 6:
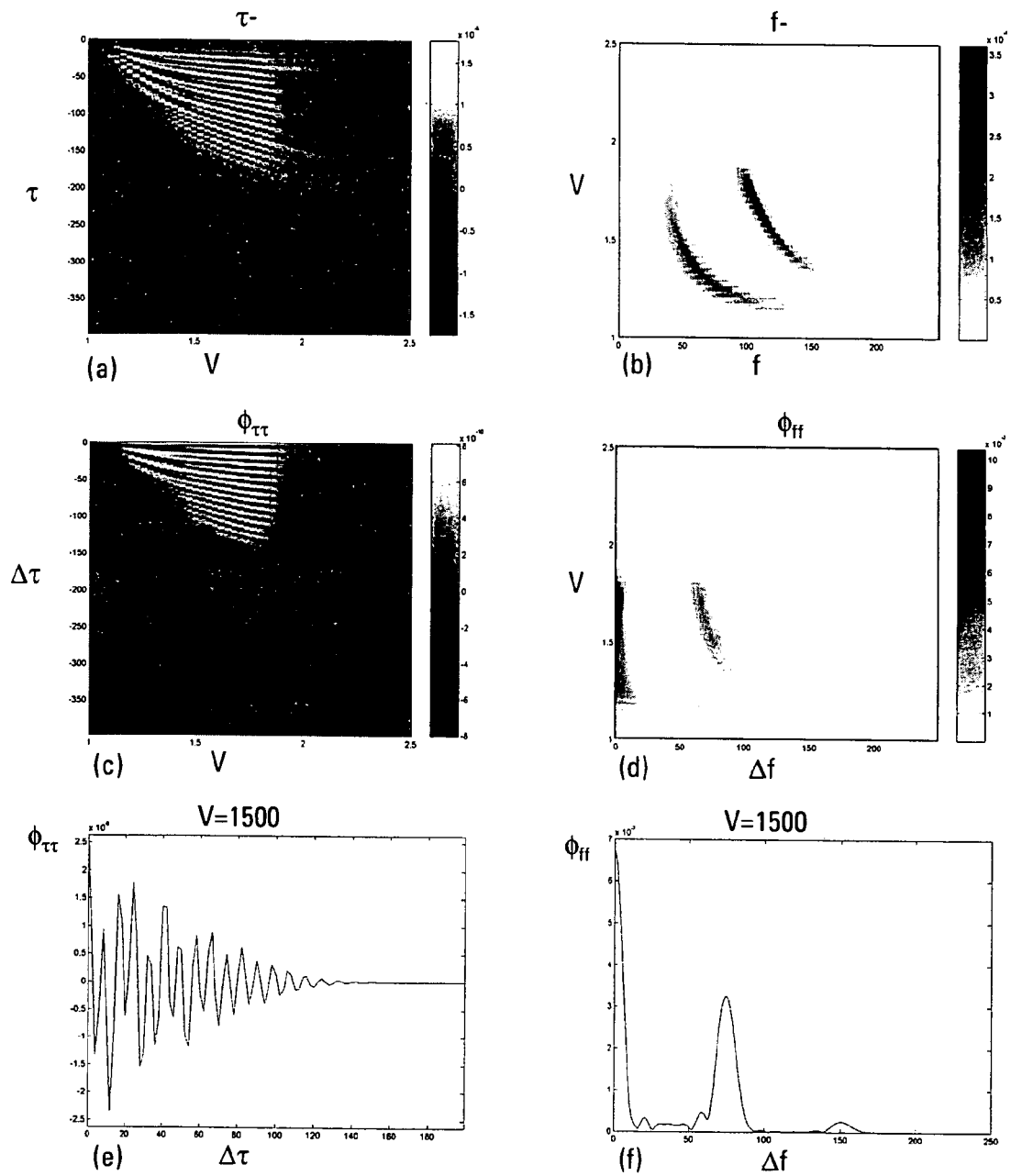
FIGS. 6(a) to 6(f) illustrate the present invention compared with processing in the τ-V domain.

This auto-correlation technique is adapted from the technique described by J F Claerbout in "Fundamentals of Geophysical Data Processing", Blackwell Scientific Publications (1976). In this method, the auto-correlation is applied in the frequency domain with frequency index i and frequency-lag index k for each value of the phase velocity V. The maxima of the modulus of the complex-valued auto-correlation function are located at integer multiples of $\Delta f$. This is illustrated in FIGS. 6(b) and 6(d). FIG. 6(b) shows the dispersion image obtained in the frequency and phase-velocity domain, and corresponds essentially to the image shown in FIG. 5. The results of the auto-correlation of the dispersion image of FIG. 6(b) are shown in FIG. 6(d), with the maximum amplitude of the auto-correlation function being represented in black and with the minimum amplitude being represented in white as shown by the key at the right hand side of FIG. 6(d). The periodic structure of the results of the auto-correlation is apparent from FIG. 6(d) and, in principle, the frequency difference between adjacent branches of the auto-correlation image can be determined, as a function of the phase velocity, direct from the auto-correlated image.

FIGS. 6(a) and 6(c) correspond to FIGS. 6(b) and 6(d) respectively, but show the t-V transformed data and its auto-correlation. It will be seen that auto-correlation in the time-domain cannot resolve the multiple structure of the dispersion image, since the multiple reflections interfere. In contrast, the multiple reflection modes are clearly separate in the frequency domain, as is clear from FIGS. 6(b) and 6(d), and the frequency difference between successive modes can be clearly measured in the auto-correlated image in the frequency domain.

FIG. 6(f) shows the results of the auto-correlation at a value for the phase velocity of 1500 m/s. It will be seen that there is a clear peak in $\Delta f$ at around 75–80 Hz and a smaller peak in $\Delta f$ at just over 150 Hz. This indicates that the value of $\Delta f$ is approximately 75 Hz at a phase velocity V=1500 m/s. (The small amplitude peak at $\Delta f \cong 150$ Hz is the result of correlation between the first and third branches or curves of the dispersion image shown in FIG. 6(b).

FIG. 6(e) shows the results of the auto-correlation in the $\tau$-V domain at a phase velocity of 1500 m/s. It will be seen that there is no clear peak in this, and this is because of the overlap between the multiple reflections in the time domain.

Although the frequency difference for a particular phase velocity can be determined direct from the results of the auto-correlation in the frequency domain, the method shown in FIG. 11 uses a consistency criterion that is analogous to that used in the method of FIG. 9. In the method of FIG. 11, the consistency criterion is applied to the auto-correlation image of FIG. 6(d) by mapping each row of the matrix $R_{kV}$ from $k = \Delta f$ to h using equation (4). The auto-correlation event is aligned when the correct waveguide velocity $c_1$ is chosen. This process is illustrated in FIGS. 7(a) to 7(i).

Figure 7:
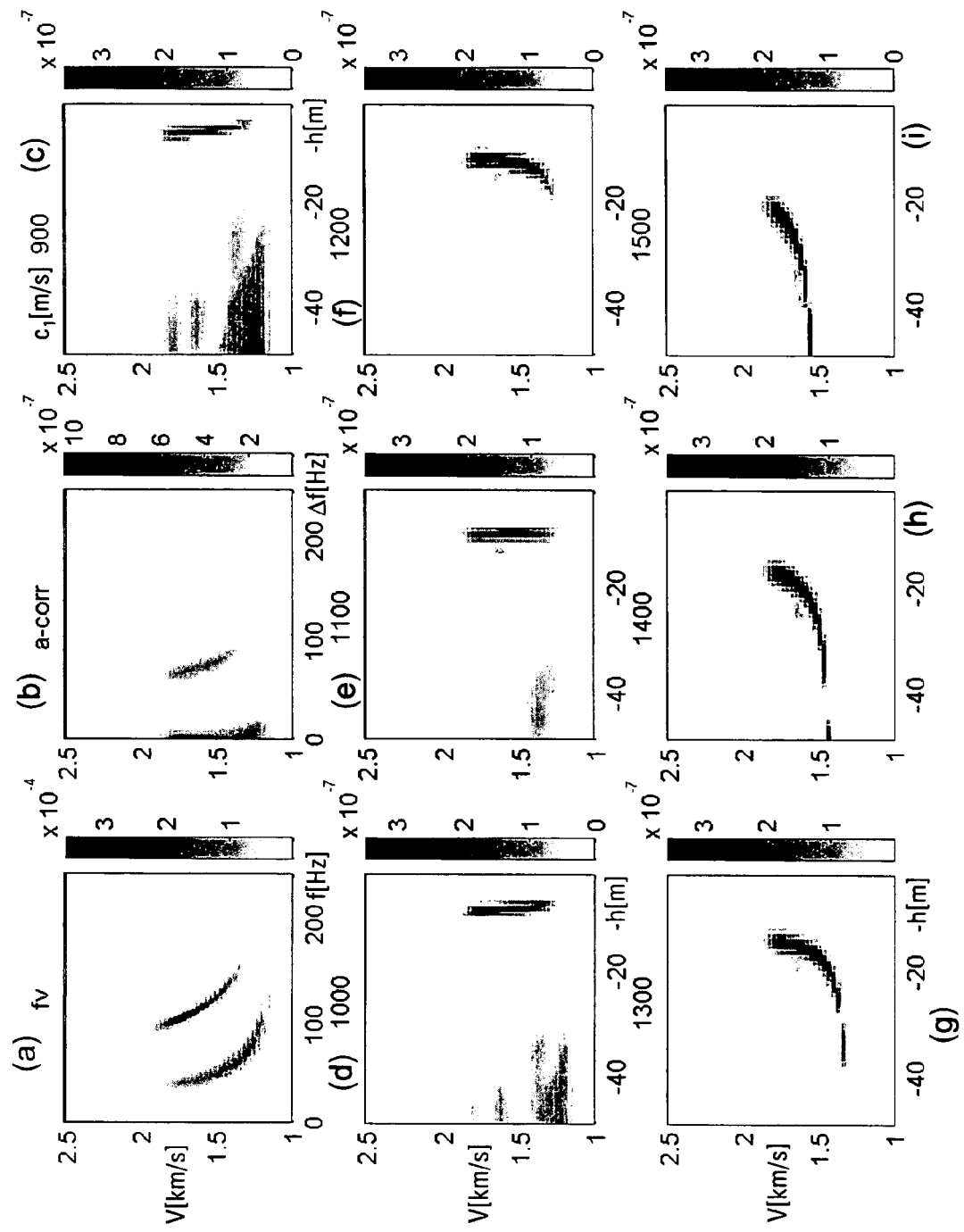
FIG. 7(a) illustrates a typical dispersion image in the frequency domain.
FIG. 7(b) illustrates the auto-correlation of the image of FIG. 7(a)
FIGS. 7(c) to 7(i) illustrate converted images of the auto-correlation image of FIG. 7(b) for different assumed layer velocities.

FIGS. 7(a) and 7(b) correspond to FIGS. 6(b) and 6(d) respectively, and show the dispersion image in the frequency domain (FIG. 7(a)) and the auto-correlation thereof (FIG. 7(b)). FIGS. 7(c) to 7(i) show the results of converting the auto-correlation image into the h-V domain (the waveguide thickness and phase velocity domain) using equation (4) for seven different values of the waveguide velocity $c_1$. FIG. 7(c), for example, shows the results obtained by converting the auto-correlation image into the h-V domain for an assumed waveguide velocity of $c_1 = 900$ m/s, FIG. 7(d) shows the results obtained for an assumed waveguide velocity of $c_1 = 1,000$ m/s, and so on.

In FIGS. 7(c) to 7(i) the results have been inverted to negative values of the layer thickness, so that the order of the events is the same as in the auto-correlation image.

By inspection of FIGS. 7(c) to 7(i), it is seen that the auto-correlation event is correctly aligned for a waveguide velocity of 1,100 m/s in FIG. 7(e). The auto-correlation image is not correctly aligned in the results obtained for other assumed values of the waveguide velocity.

Furthermore, in FIG. 7(e) the auto-correlation event is aligned at a waveguide thickness h of 10 m. Thus, the results of FIGS. 7(c) to 7(i) indicate that the waveguide has a waveguide velocity $c_1$ of 1,100 m/s and a thickness h of 10 m.

The step of transforming the auto-correlation image to the thickness-phase velocity domain, and picking the correct waveguide velocity and thickness is step 114 in the method of FIG. 11. The obtained values for the waveguide thickness and the waveguide velocity are then output at step 115. (In the case of FIGS. 7(a) to 7(i), for example, the values h=10 m and $c_1$=1,100 m would be output at step 115.)

Where the invention is applied to a guided wavefield propagating in a layer at or near the earth's surface, such as the layer 4 of FIG. 2, the invention is able to determine the wave propagation velocity in, and the thickness of, the surface or near-surface layer. These values may be used in subsequent processing of the wavefield. Where the recorded wavefield data are seismic data, for example, the invention may be used to determine one or more parameters of a layer of the earth, such as a surface or near-surface layer, that acts as a waveguide. These parameters may then be used in subsequent processing of the seismic data. For example, the waveguide parameters can be used to determine the static shift produced by the surface or near surface layer, and so allow the acquired seismic data to be corrected for the static shift. The waveguide parameters may alternatively be used in wavefield separation. The parameters of the surface or near-surface layer may also be used in the processing of other seismic data acquired at that survey location.

The invention has been explained above with reference to an acoustic waveguide. The invention is not limited to this, however, and may also be applied to a waveguide in an elastic medium. The dispersion curves of guided P-waves and guided S-waves can be analysed using the methods of the invention to obtain the P-wave and S-wave velocities of an elastic waveguide, and also to obtain the thickness of an elastic waveguide. The P-velocity of a waveguide can be determined using the above methods. The S-velocity of the waveguide can be determined from the dispersion image of the higher modes of the ground roll. The S-velocity may be determined using any of the methods described above, but applied to a different part of the data. To do this, the dispersion images must cover the range of P- and S-velocities, either in a single image or in separate images.

Any technique that creates a dispersion image from recorded wavefield data can be used to obtain the dispersion image in the frequency domain. One approach is to transform the recorded wavefield from the time-space domain into the frequency-slowness or frequency-phase velocity domain, for example as described by McMechen and Yedlin, above. A parametric spectral analysis tool such as the "FK-MUSIC" algorithm proposed by K Iranpour et al. in "Local Velocity Analysis by Parametric Wave Number Estimation in Seismic (FK-MUSIC)", EAGE Expanded Abstracts (2002) may be used. This technique can obtain a high-resolution dispersion image from fewer traces than with the method of McMechen and Yedlin.

The discussion given above has assumed a one-dimensional model of the waveguide, in which the waveguide is laterally invariant in velocity and thickness. Laterally-varying waveguide properties can be estimated using the methods of the present invention if the obtained dispersion image corresponds to a locally one-dimensional medium. Local dispersion images may be obtained with the FK-MUSIC algorithm of Iranpour et al.

Figure 12:
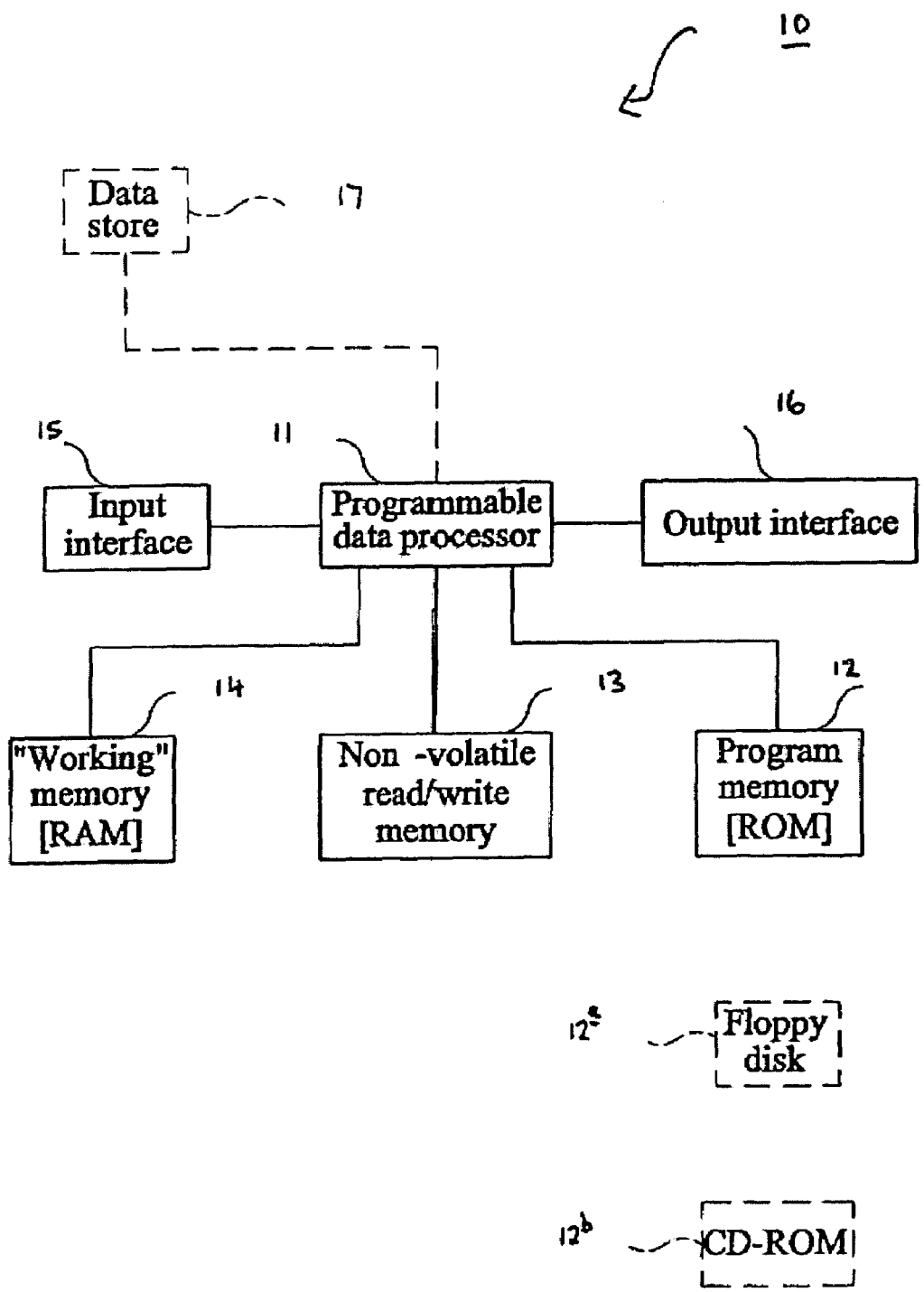
FIG. 12 is a block schematic diagram of an apparatus according to the present invention.

FIG. 12 is a schematic block diagram of a programmable apparatus 10 according to the present invention. The apparatus comprises a programmable data processor 11 with a program memory 12, for instance in the form of a read only memory ROM, storing a program for controlling the data processor 11 to perform any of the processing methods described above. The apparatus further comprises nonvolatile read/write memory 13 for storing, for example, any data which must be retained in the absence of power supply. A "working" or "scratchpad" memory for the data processor is provided by a random access memory (RAM) 14. An input interface 15 is provided, for instance for receiving commands and data. An output interface 16 is provided, for instance for displaying information relating to the progress and result of the method. Seismic data for processing may be supplied via the input interface 15, or may alternatively be retrieved from a machine-readable data store 17.

The program for operating the system and for performing the method described hereinbefore is stored in the program memory 12, which may be embodied as a semi-conductor memory, for instance of the well-known ROM type. However, the program may be stored in any other suitable storage medium, such as magnetic data carrier 12a (such as a "floppy disc") or CD-ROM 12b.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of determining at least one parameter of a waveguide from wavefield data acquired from wave propagation in the waveguide, the method comprising the steps of:
    obtaining a first and a second dispersion curves corresponding to different guided wave modes in the frequency domain from the wavefield data;
    determining at least one parameter of the waveguide from a frequency interval between the first dispersion curve and the second dispersion curve;
    obtaining the first and second dispersion curves in the frequency and phase velocity domain;
    determining the velocity of wave propagation in the waveguide from the dispersion curves as the asymptotic velocity limit of the dispersion curves; and
    storing the determined velocity of wave propagation.

2. A method as claimed in claim 1 comprising determining the frequency separation $\Delta f(V)$ between the first and second dispersion curves at a first value of the phase velocity V.

3. A method as claimed in claim 2 comprising determining the thickness h of the waveguide using:

$$\Delta f(V) = \frac{c_1}{2h\sqrt{1 - \frac{c_1^2}{V^2}}}$$

where $c_1$ is the velocity of wave propagation in the waveguide.

4. A method as claimed in claim 1 comprising determining values of the frequency separation between the first dispersion curve and the second dispersion curve for at least two different values of the phase velocity.

5. A method as claimed in claim 4 comprising determining the thickness of the waveguide from the values of the frequency separation between the first dispersion curve and the second dispersion curve for at least two different values of the phase velocity.

6. A method as claimed in claim 4 comprising determining the thickness h of the waveguide using:

$$h = \frac{c_1}{2\Delta f(V)\sqrt{1 - \frac{c_1^2}{V^2}}} \ \forall \ V$$

7. A method as claimed in claim 1 and comprising the step of auto-correlating in the frequency-velocity domain the first and second dispersion curves, and determining at least one parameter of the waveguide from the results of the auto-correlation step.

8. A method of processing wavefield data, the method comprising: acquiring wavefield data; determining at least one parameter of a waveguide according to a method of claim 1; and taking the at least one parameter into account during subsequent processing of the wavefield data.

9. A method as claimed in claim 8 wherein the wavefield data are seismic wavefield data.

10. A method as claimed in claim 1 wherein the step of determining at least one parameter is independent of density of the waveguide.

11. A method as claimed in claim 10 wherein the step of determining at least one parameter is independent of density of a layer below the waveguide.

12. A method as claimed in claim 1 wherein the first and second dispersion curves are adjacent in the frequency domain and phase velocity domain.

13. A storage medium containing a program for controlling a programmable data processor to carry out a method as defined claim 1.

14. An apparatus for determining at least one parameter of a waveguide from wavefield data acquired from wave propagation in the waveguide, the apparatus comprising:
 a processor for obtaining first and second dispersion curves corresponding to different guided wave modes in the frequency domain from the wavefield data;
 a processor for determining at least one parameter of the waveguide from a frequency interval between the first dispersion curve and the second dispersion curve;
 a calculator for obtaining first and second dispersion curves in the frequency and phase velocity domain;
 a calculator for determining the velocity of wave propagation in the waveguide from the dispersion curves and wherein said apparatus
 is adapted to determine the velocity of wave propagation in the waveguide as the asymptotic velocity limit of the dispersion curves.

15. An apparatus as claimed in claim 14 comprising a frequency separator for determining the frequency separation $\Delta f(V)$ between the first and second dispersion curves at a first value of the phase velocity $V$.

16. An apparatus as claimed in claim 15 and comprising thickness meter for determining the thickness h of the waveguide using:

$$\Delta f(V) = \frac{c_1}{2h\sqrt{1 - \frac{c_1^2}{V^2}}}$$

where $c_1$ is the velocity of wave propagation in the waveguide.

17. An apparatus as claimed in claim 14 adapted to determine values of the frequency separation between the first dispersion curve and the second dispersion curve for at least two different values of the phase velocity.

18. An apparatus as claimed in claim 17 adapted to determining the thickness of the waveguide from the values of the frequency separation between the first dispersion curve and the second dispersion curve for at least two different values of the phase velocity.

19. An apparatus as claimed in claim 17 comprising means for determining the thickness h of the waveguide using:

$$h = \frac{c_1}{2\Delta f(V)\sqrt{1 - \frac{c_1^2}{V^2}}} \ \forall\ V$$

20. An apparatus as claimed in claim 14 comprising correlator for auto-correlating, in the frequency-velocity domain, the first and second dispersion curves, and a calculator for determining at least one parameter of the waveguide from the output of the auto-correlation means.

21. An apparatus as claimed in claim 14 comprising a programmable data processor.

22. A storage medium containing a program for the data processor of an apparatus as defined in claim 21.

23. An apparatus as claimed in claim 14 wherein the processor for determining at least one parameter is independent of density of the waveguide.

24. An apparatus as claimed in claim 23 wherein the processor for determining at least one parameter is independent of density of a layer below the waveguide.

25. An apparatus as claimed in claim 14 wherein the first and second dispersion curves are adjacent in the frequency domain and phase velocity domain.

* * * * *